(12) United States Patent
Li et al.

(10) Patent No.: US 12,529,765 B2
(45) Date of Patent: Jan. 20, 2026

(54) METHOD AND DEVICE FOR CONTROLLING MICRO GALVANOMETER OF SOLID-STATE LiDAR AND SOLID-STATE LiDAR

(71) Applicant: SUTENG INNOVATION TECHNOLOGY CO., LTD., Shenzhen (CN)

(72) Inventors: Yipeng Li, Shenzhen (CN); Hankui Zhang, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 1054 days.

(21) Appl. No.: 17/568,605

(22) Filed: Jan. 4, 2022

(65) Prior Publication Data

US 2022/0291350 A1 Sep. 15, 2022

Related U.S. Application Data

(63) Continuation of application No. PCT/CN2021/080179, filed on Mar. 11, 2021.

(51) Int. Cl.
*G01S 7/481* (2006.01)
*G01S 7/48* (2006.01)
(Continued)

(52) U.S. Cl.
CPC .......... *G01S 7/4817* (2013.01); *G01S 7/4802* (2013.01); *G01S 17/58* (2013.01); *G01S 17/931* (2020.01)

(58) Field of Classification Search
CPC ...... G01S 7/4817; G01S 7/4802; G01S 17/58; G01S 17/931; G01S 17/42
See application file for complete search history.

(56) References Cited

U.S. PATENT DOCUMENTS 10,324,170 B1 * 6/2019 Engberg, Jr. .......... G01S 7/4818
2010/0149407 A1 6/2010 Lee et al.
(Continued)

FOREIGN PATENT DOCUMENTS

CN 110632618 A 12/2019
CN 111239760 A 6/2020
(Continued)

OTHER PUBLICATIONS

Prasad et al. "High-speed wide-angle interleaved scanning technique for a 3D imaging lidar", 2021.*
(Continued)

*Primary Examiner* — Assres H Woldemaryam
(74) *Attorney, Agent, or Firm* — BAYES PLLC

(57) ABSTRACT

The present application discloses a method and a device for controlling a micro galvanometer of a solid-state LiDAR, and a solid-state LiDAR. The method includes acquiring a vertical angle range of a field of view scanned by the solid-state LiDAR, determining a first vertical angle of the field of view and a second vertical angle of the field of view corresponding to a preset ROI region of the solid-state LiDAR, reducing a slow axis scanning speed of the micro galvanometer to a first preset speed when it is monitored that the micro galvanometer scans the first vertical angle of the field of view, and adjusting the slow axis scanning speed of the micro galvanometer to a second preset speed when it is monitored that the micro galvanometer scans the second vertical angle of the field of view.

8 Claims, 8 Drawing Sheets

(51) Int. Cl.
    *G01S 17/58*        (2006.01)
    *G01S 17/931*     (2020.01)

(56) References Cited

U.S. PATENT DOCUMENTS

| | | |
|---|---|---|
| 2017/0356983 A1 | 12/2017 | Jeong et al. |
| 2018/0067195 A1 | 3/2018 | Slobodyanyuk et al. |
| 2020/0379090 A1 | 12/2020 | Nothern, III et al. |
| 2020/0386872 A1 | 12/2020 | Keilaf et al. |
| 2021/0181321 A1* | 6/2021 | Huang ............... G02B 26/12 |
| 2022/0187071 A1* | 6/2022 | Yehuday ............ H04N 9/3129 |
| 2022/0413105 A1* | 12/2022 | Wang ................. G01S 17/89 |

FOREIGN PATENT DOCUMENTS

| | | | |
|---|---|---|---|
| CN | 111999720 A | 11/2020 | |
| EP | 3951422 A1 * | 2/2022 | ............ G01S 7/499 |

OTHER PUBLICATIONS

First Office Action issued in related Chinese Application No. 202180093854.7, mailed Jul. 24, 2024, 7 pages.
First Office Action issued in related Chinese Application No. 202180093911.1, mailed Jul. 12, 2024, 9 pages.
European Search Report issued in related European Application No. 21929749.6, mailed Aug. 2, 2024, 16 pages.
International Search Report issued in corresponding international application No. PCT/CN2021/080179, dated Dec. 16, 2021, 5 pages.

\* cited by examiner

METHOD AND DEVICE FOR CONTROLLING MICRO GALVANOMETER OF SOLID-STATE LiDAR AND SOLID-STATE LiDAR

CROSS-REFERENCE TO RELATED APPLICATION

The present application is a continuation of International Application No. PCT/CN2021/080179, filed on Mar. 11, 2021, which is incorporated herein by reference in its entirety.

TECHNICAL FIELD

The present application relates to the field of measurement technologies, and in particular, to a method and a device for controlling a micro galvanometer of a solid-state LiDAR, and a solid-state LiDAR.

BACKGROUND

LiDAR based on Micro-Electro-Mechanical System (MEMS) micro galvanometer technology has the advantages of fast response, high ranging resolution, and the like. When detection laser light of the LiDAR emits to a MEMS micro galvanometer, as the micro galvanometer vibrates, the detection laser light deflects on a surface of the micro galvanometer to form a field of view. When the micro galvanometer vibrates in two dimensions, a 2D field of view is formed, thereby obtaining distance information from a surface of a target object.

The LiDAR based on the MEMS micro galvanometer in the prior art can achieve uniform scanning of the 2D field of view via the micro galvanometer, which cannot meet the requirements for accurate detection. In order to achieve precise scanning of the LiDAR, it is necessary to effectively control a resolution of an ROI region.

SUMMARY

To solve the technical problem, an embodiment of the present application provides a method and a device for controlling a micro galvanometer of a solid-state LiDAR, and a solid-state LiDAR, which can effectively control a resolution of an ROI region and enable the LiDAR to achieve precise scanning.

In a first aspect, the present application provides a method for controlling a micro galvanometer of a solid-state LiDAR, including:
  acquiring a vertical angle range of a field of view scanned by the solid-state LiDAR;
  determining a first vertical angle of the field of view and a second vertical angle of the field of view corresponding to a preset ROI region of the solid-state LiDAR, wherein a region between the first vertical angle of the field of view and the second vertical angle of the field of view is a range of a vertical field of view corresponding to the preset ROI region;
  when it is monitored that the micro galvanometer scans the first vertical angle of the field of view, reducing a slow axis scanning speed of the micro galvanometer to a first preset speed; and when it is monitored that the micro galvanometer scans the second vertical angle of the field of view, adjusting the slow axis scanning speed of the micro galvanometer to a second preset speed, wherein the first preset speed is less than the second preset speed.

In a second aspect, the present application provides a method for controlling a micro galvanometer of a solid-state LiDAR, including:
  acquiring a scanning period of the solid-state LiDAR;
  determining a first time and a second time in the scanning period corresponding to the preset ROI region of the solid-state LiDAR, wherein the first time is a starting time when a scanning optical path enters the preset ROI region, and wherein the second time is an ending time when the scanning optical path leaves the preset ROI region;
  when it is monitored that the micro galvanometer scans the first time, reducing the slow axis scanning speed of the micro galvanometer to a first preset speed; and
  when it is monitored that the micro galvanometer scans the second time, adjusting the slow axis scanning speed of the micro galvanometer to a second preset speed, wherein the first preset speed is less than the second preset speed.

In a third aspect, the present application provides a device for controlling a micro galvanometer, including:
  an acquiring module, configured to acquire a vertical angle range of a field of view scanned by a solid-state LiDAR;
  a determining module, configured to determine a first vertical angle of the field of view and a second vertical angle of the field of view corresponding to a preset ROI region of the solid-state LiDAR, wherein a middle region of the first vertical angle of the field of view and the second vertical angle of the field of view is a range of a vertical field of view corresponding to the ROI region; and
  a controlling module, configured to reduce a slow axis scanning speed of the micro galvanometer to a first preset speed when it is monitored that the micro galvanometer scans the first vertical angle of the field of view, and to adjust the slow axis scanning speed of the micro galvanometer to a second preset speed when it is monitored that the micro galvanometer scans the second vertical angle of the field of view, wherein the first preset speed is less than the second preset speed.

In a fourth aspect, the present application provides a device for controlling a micro galvanometer, including:
  an acquiring module, configured to acquire a scanning period of a solid-state LiDAR;
  a determining module, configured to determine a first time and a second time in the scanning period corresponding to a preset ROI region of the solid-state LiDAR, wherein the first time is a starting time when a scanning optical path enters the ROI region, and wherein the second time is a time when the scanning optical path leaves the ROI region; and
  a controlling module, configured to reduce a slow axis scanning speed of the micro galvanometer to a first preset speed when it is monitored that the micro galvanometer scans the first time, and to adjust the slow axis scanning speed of the micro galvanometer to a second preset speed when it is monitored that the micro galvanometer scans the second time, wherein the first preset speed is less than the second preset speed.

In a fifth aspect, the present application provides a solid-state LiDAR system, including:
  an emitting module, configured to emit detection laser light;

a receiving module, configured to receive echo laser light;

a micro galvanometer scanning device, configured to deflect the detection laser light to achieve scanning, and also configured to receive the echo laser light and deflect the echo laser light to the receiving module; and the forgoing devices for controlling the micro galvanometer, configured to control a micro galvanometer scanning device to scan.

In an embodiment of the present application, a vertical angle range of the field of view scanned by the solid-state LiDAR includes a range of a vertical field of view of a preset ROI region. A first vertical angle of the field of view corresponding to a starting position and a second vertical angle of view corresponding to an ending position are determined according to a range of the preset ROI region. During an operating process of a micro galvanometer scanning module, a 2D galvanometer moves from a previous position to a next position along a slow axis, and completes a reciprocating motion along a fast axis to scan a line of the field of view. Similarly, during a process that the micro galvanometer continues to move along the slow axis to the next position, the reciprocating motion along the fast axis starts to scan a next line of the field of view. Therefore, the scanning speed of the slow axis of the micro galvanometer determines a spacing between scanned lines. When the scanning speed of the slow axis of the micro galvanometer decreases, the spacing between the scanned lines becomes smaller, and a vertical resolution is improved. On the contrary, when the scanning speed of the slow axis of the micro galvanometer increases, the spacing between the scanned lines becomes larger, and the vertical resolution is decreased. When it is detected that the micro galvanometer scans the first vertical angle of view, it means that the scanning optical path at this time enters the preset ROI region. The slow axis scanning speed of the micro galvanometer is reduced and the vertical resolution of the scanning of the solid-state LiDAR is improved. When the micro galvanometer scans the second vertical angle of view, it means that the scanning optical path at this time leaves the ROI region. The slow axis scanning speed is adjusted to the second preset speed, and the second preset speed is greater than the first preset speed. Compared with the ROI region, the vertical resolution of solid-state LiDAR scanning is reduced. By controlling the slow axis scanning speed of a MEMS micro galvanometer, a vertical scanning of a preset middle ROI region is denser and two sides are sparser, so that the vertical resolution of the preset ROI is effectively improved, and the LiDAR can scan accurately in the ROI region.

BRIEF DESCRIPTION OF DRAWINGS

In order to more clearly describe the technical solutions in embodiments of the present application, the following describes the drawings that need to be used in the embodiments of the present application.

DETAILED DESCRIPTION

In order to make objectives, features, and advantages of embodiments of the present application more obvious and understandable, the technical solutions in the embodiments of the present application are described clearly and completely in conjunction with the drawings in the embodiments of the present application. Obviously, the described embodiments are only a part of the embodiments of the present application, but not all the embodiments. Based on the embodiments of the present application, all other embodiments obtained by the person skilled in the art without inventive labor shall fall within the protection scope of the present application.

When the following description refers to the drawings, unless otherwise indicated, the same numbers in different drawings indicate the same or similar elements. The implementation described in the following exemplary embodiments do not represent all implementations consistent with the present application. On the contrary, the implementation is merely examples of devices and methods consistent with some aspects of the present application as detailed in the appended claims.

In the description of the present application, it shall be understood that the terms such as "first" and "second" are merely intended for a purpose of description, and shall not be understood as an indication or implication of relative importance. The person skilled in the art can understand specific meanings of the foregoing terms in the present application to a specific situation.

Figure 1:
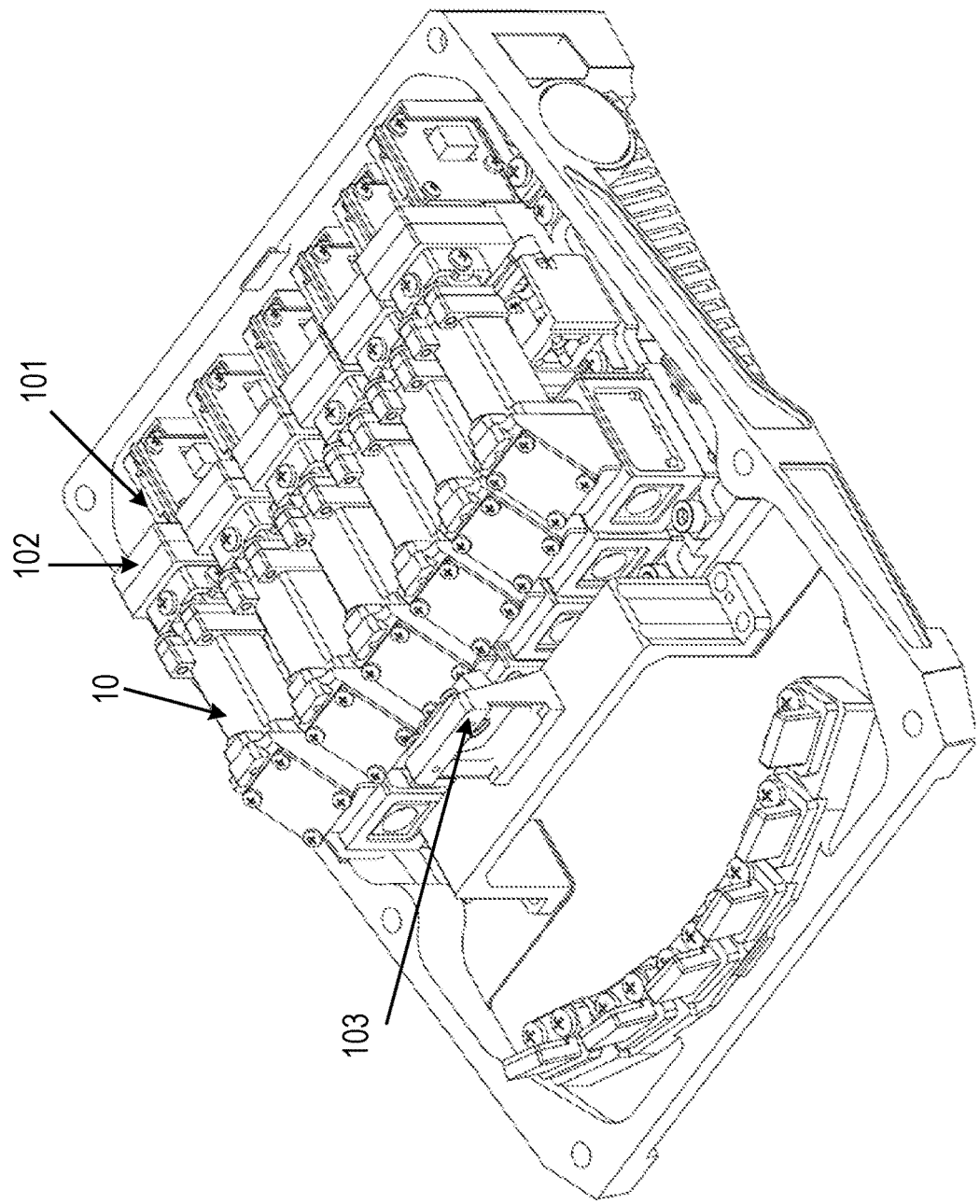
FIG. 1 is a schematic structural diagram of a solid-state LiDAR according to an embodiment of the present application.

As shown in FIG. 1, a solid-state LiDAR of the present application includes at least one transceiving assembly 10. The transceiving assembly 10 includes a transmitting module 101, a beam splitting module (not shown in the figure), and a receiving module 102. The transmitting module 101 is configured to emit detection laser light to the beam splitting module. The beam splitting module is configured to make the detection laser light pass through the beam splitting module and then emit outward, and also configured to deflect coaxially incident echo laser light and emit the coaxially incident echo laser light towards the receiving module 102. The receiving module 102 is configured to receive the echo laser light from the beam splitting module. The detection laser light emitted by the transmitting module 101 is transmitted into a field of view after passing through the beam splitting module. The echo laser light is received by the receiving module 102 after being deflected by the beam splitting module.

The LiDAR based on a micro galvanometer also includes a micro galvanometer scanning module 103. The detection laser light and the echo laser light are both transmitted to the micro galvanometer scanning module 103. The micro galvanometer scanning module 103 performs 2D vibration and is configured to deflect the detection laser light and the echo laser light to detect the field of view. The detection laser light from the transceiving assembly is transmitted to the micro galvanometer scanning module 103. The micro galvanometer scanning module 103 reflects and deflects the detection laser light and emits the detection laser light outwards to achieve scanning. After the echo laser light returning after being reflected by an object is received by the micro galvanometer module 103, the echo laser light emits to the transceiving assembly, and the transceiving assembly receives the echo laser light.

The optical path of the detection laser light and the optical path of the echo laser light are coaxial, but in opposite directions. For the convenience of description, the optical path of the detection laser light is taken as an example for description. The micro galvanometer scanning module 103 includes a 2D galvanometer, and the 2D galvanometer vibrates around a fast axis and a slow axis to achieve a 2D deflection. The detection laser emits to the 2D galvanometer. The 2D galvanometer reflects the detection laser light and then emits the detection laser light outward. The detection laser light covers a vertical angle range of the field of view and a horizontal angle range of the field of view, and scans the 2D field of view. The 2D galvanometer vibrates around the fast axis to make the detection laser light cover the horizontal angle range of the field of view. The 2D galvanometer vibrates around the slow axis to make the detection laser light cover the vertical angle range of the field of view. For example, during an operating process of the micro galvanometer scanning module 103, the 2D galvanometer starts to move along the slow axis and the fast axis from a starting position. The detection laser light is reflected by the 2D galvanometer at this point and then emits to an upper left corner of the field of view. When the 2D galvanometer moves along the slow axis to the next position, the 2D galvanometer completes one reciprocating motion along the fast axis to scan a first line of the field of view. Similarly, when the micro galvanometer moves along the slow axis to the next position, the micro galvanometer performs the reciprocating motion along the fast axis and starts the scanning of a next line of the field of view. Until the 2D galvanometer moves along the slow axis to the lowest position, the 2D galvanometer completes one reciprocating motion along the fast axis, and then one scanning cycle is completed. The starting position of the 2D galvanometer can be any position in the scanning cycle, such as an upper right corner, a lower right corner, a center position, etc. A direction of movement along the fast axis and the slow axis is not limited, such as scanning from the right to left along the fast axis, such as scanning from bottom to top along the slow axis. The starting position of the 2D galvanometer and the direction of movement along the fast axis and the slow axis do not affect a scanning pattern and a scanning period of the 2D galvanometer.

The solid-state LiDAR can include one transceiving assembly 10 or a plurality of transceiving assemblies 10. The specific number of the transceiving assemblies 10 can be determined according to actual usage requirements, which is not limited here. No matter one transceiving assembly 10 or a plurality of transceiving assemblies 10 are provided, the same micro galvanometer scanning module 103 is shared. Since the plurality of transceiving assemblies 10 cannot be overlapped in space, optical paths of the transceiving assemblies 10 emit to the 2D galvanometer of the micro galvanometer scanning module 103 at different incident angles. After being reflected by the 2D galvanometer, the optical paths emit to the field of view at different emergent angles and scan different regions of the field of view. Since a deflection angle of the 2D galvanometer is limited by a device, the horizontal angle of the field of view formed by each of the transceiving assemblies 10 is limited. When the LiDAR needs the larger horizontal angle of the field of view, for example, when the LiDAR needs to reach the horizontal angle of the field of view of 120°, the LiDAR can use four transceiving assemblies 10 with the angle of the field of view of 30°, and the plurality of transceiving assemblies 10 are spliced in a horizontal direction.

Figure 2A:
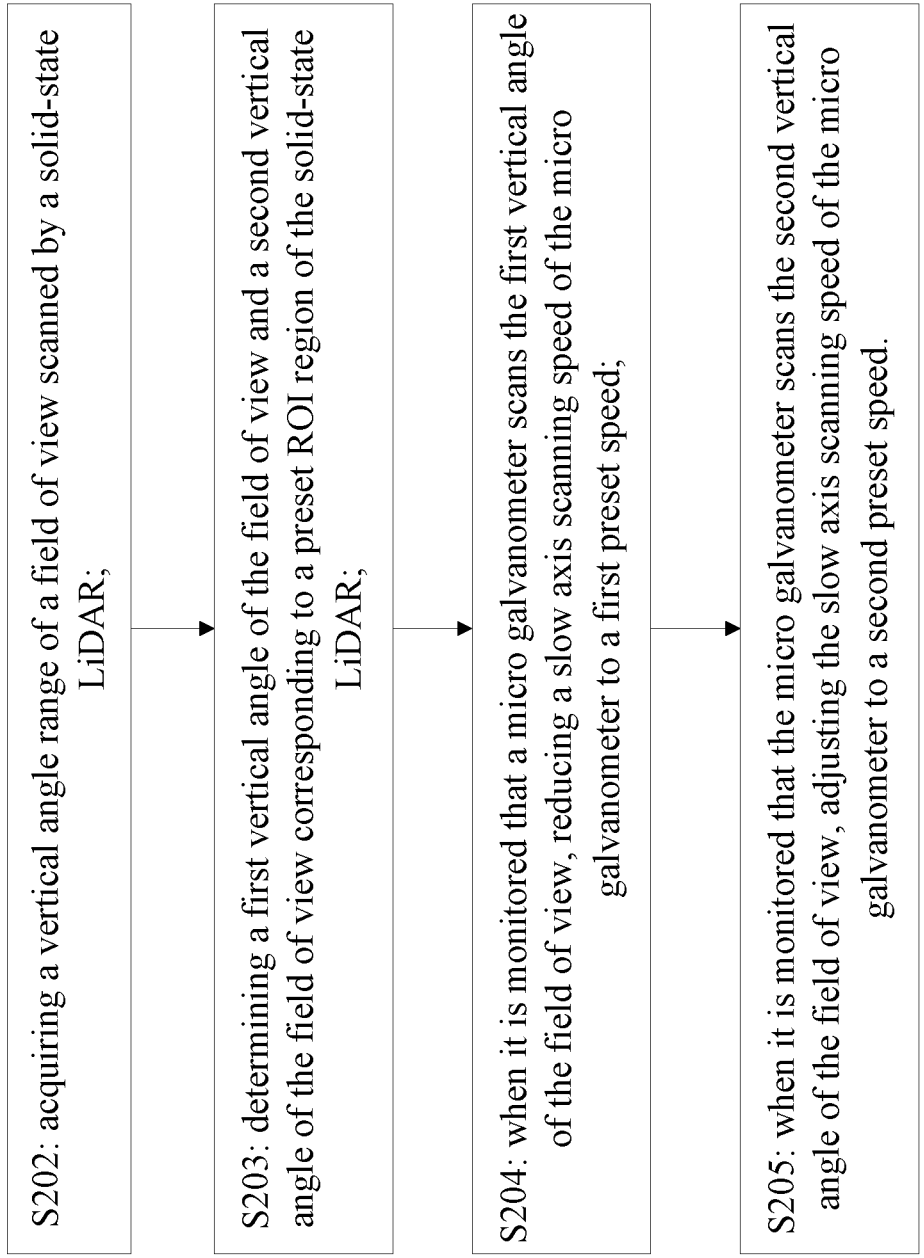
FIG. 2a is a schematic flowchart of a method for controlling a micro galvanometer of a solid-state LiDAR according to an embodiment of the present application.
Figure 2B:
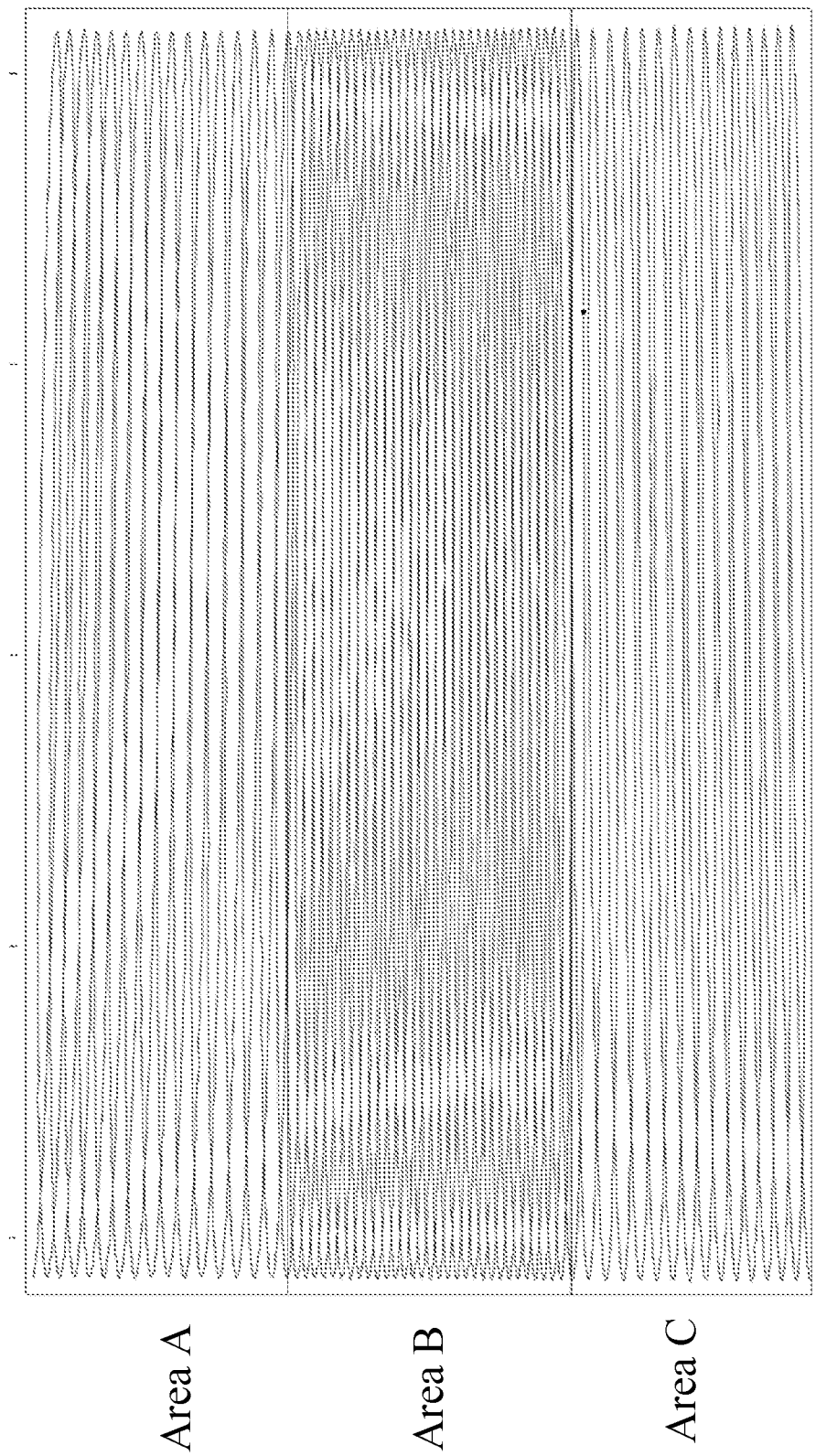
FIG. 2b is a schematic diagram of a scanning pattern in a field of view according to an embodiment of this application.
Figure 2C:
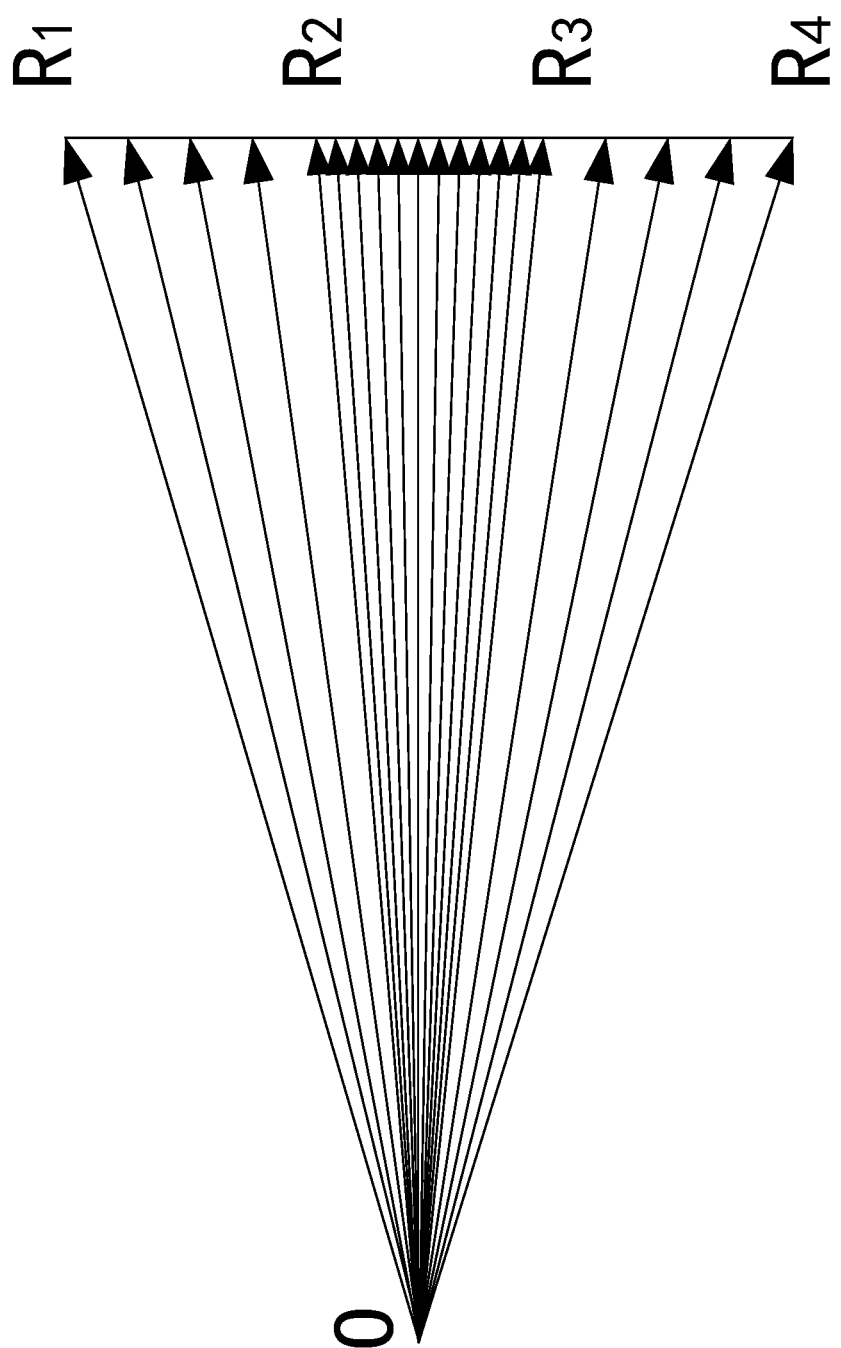
FIG. 2c is a schematic diagram of distribution of detection beams in a vertical direction according to an embodiment of this application.

Please refer to FIG. 2a, FIG. 2a is a schematic flowchart of a method for controlling a micro galvanometer of a solid-state LiDAR according to an embodiment of the present application. The method includes but is not limited to the following steps:

S202: acquiring a vertical angle range of a field of view scanned by the solid-state LiDAR.

As mentioned above, detection laser light and echo laser light of the solid-state LiDAR detect a 2D field of view via the scanning of the micro galvanometer. The micro galvanometer vibrates around the slow axis to cover the vertical angle range of the field of view. The optical path of the detection laser light and the optical path of the echo laser light are coaxial, but in opposite directions. For the convenience of description, the optical path of the detection laser light is taken as an example for description. The detection laser light emits to the micro galvanometer at an incident angle α, and then emits outward at a reflection angle a after being reflected by the micro galvanometer. The micro galvanometer is driven to move. The incident angle α of the detection laser light is also constantly changed. An outward emitting angle after the detection laser light is reflected by the micro galvanometer is also constantly changed. Therefore, the range of the field of view of the solid-state LiDAR formed by the vibration of the micro galvanometer is determined by an amplitude of the micro galvanometer. The vertical angle range of the field of view is proportional to a slow axis amplitude of the micro galvanometer.

When the solid-state LiDAR is designed, according to detection requirements, the micro galvanometers with different amplitudes of the slow axis are selected. Therefore, the amplitude of the slow axis can be determined according to a model of the micro galvanometer, and then the vertical angle range of the field of view of the solid-state LiDAR can be acquired. It is also possible to acquire the amplitude of the slow axis or the maximum angle of deflection along the slow axis according to a sensor of the micro galvanometer, and then acquire the vertical angle range of the field of view of the solid-state LiDAR.

In one of the embodiments, the vertical angle of the field of view formed by the micro galvanometer scanning is 25°. A center of the vertical angle of the field of view is aligned with a 0° position directly in front. Therefore, the vertical angle of the field of view of the solid-state LiDAR ranges from −12.5° to 12.5°.

S203: determining a first vertical angle of the field of view and a second vertical angle of the field of view corresponding to a preset ROI region of the solid-state LiDAR; wherein, a region between the first vertical angle of the field of view and the second vertical angle of the field of view is a range of a vertical field of view corresponding to the preset ROI region.

According to the detection requirements, the preset ROI region is arranged in a vertical direction in the field of view of the solid-state LiDAR, and the preset ROI region is scanned more accurately to achieve a "gaze" function, that is, a scanning beam formed by the movement of the micro galvanometer is denser. A starting boundary of the preset ROI region corresponds to the first vertical angle of the field of view. An ending boundary corresponds to the second vertical angle of the field of view. A region between the first vertical angle of the field of view and the second vertical angle of the field of view is a range of a vertical field of view corresponding to the preset ROI region. With the preset ROI region, detection beam resources detected by the solid-state LiDAR are concentrated in the more important ROI region, with a higher vertical resolution, which can accurately detect small objects or detailed features of the objects. The vertical resolution of the non-ROI region becomes correspondingly smaller, which can save back-end data processing algorithm resources.

The preset ROI region can be preset in a design of the solid-state LiDAR. Taking the forgoing vertical angle range of the field of view of −12.5°~12.5° as an example, a region directly in front of the field of view is usually focused by the solid-state LiDAR. The solid-state LiDAR can be designed as the preset ROI region with the vertical angle of the field of view of −3°~3°, that is, the first vertical angle of the field of view is 3°, and the second vertical angle of the field of view is −3°.

It can be understood that a space in which the field of view of the solid-state LiDAR is aligned is related to a fixed position of the space and a detection range corresponding to detection requirements of different scenarios. The first vertical angle of the field of view and the second vertical angle of the field of view corresponding to the preset ROI region can be determined by a fixed height of the solid-state LiDAR and the detection range corresponding to the preset ROI region. Specifically, the first vertical angle of the field of $$\text{view} = \arctan\frac{\text{a fixed height of the solid-state } LiDAR}{\text{distance from the starting point of the preset}},$$
$$\text{ROI region to the solid-state } LiDAR$$

the second vertical angle of the field of $$\text{view} = \arctan\frac{\text{a fixed height of the solid-state } LiDAR}{\text{a distance from the starting point of the preset}}.$$
$$\text{ROI region to the solid-state } LiDAR$$

For example, when the solid-state LiDAR is mounted on top of a vehicle, the fixed height is 1.5 m~2 m. Vehicle detection and ground line detection are mainly considered. The detection range that needs to be accurately detected can be determined, which is the preset ROI region. It can be calculated that the first vertical angle of the field of view is 2°, and the second vertical angle of the field of view is −6°. The range of the vertical field of view corresponding to the preset ROI region is −6°~2°. When the solid-state LiDAR is mounted on a front grille of the vehicle, the fixed height is 0.4 m~0.6 m. The vehicle and the ground line are mainly detected. The preset ROI region can be determined. Based on this, the first vertical angle of the field of view can be calculated to 3°. The second vertical angle of the field of view is −5°. The range of the vertical field of view corresponding to the preset ROI region is −5°~3°.

The preset ROI region can also be freely determined. During the use of the solid-state LiDAR, position signals from a host computer are received. The position signals include information of the first vertical angle of the field of view and the second vertical angle of the field of view. The host computer can receive the freely configured preset ROI region, and calculate the range of the vertical field of view corresponding to the preset ROI region based on this, generate the position signals, then send the position signals to the solid-state LiDAR.

The forgoing contents disclose that the field of view of the solid-state LiDAR includes one preset ROI region. The solid-state LiDAR can include two or more preset ROI regions. Taking the two preset ROI regions as an example for description, the two preset ROI regions are a first preset ROI region and a second preset ROI region, respectively. The first preset ROI region corresponds to the first vertical angle of the field of view and the second vertical angle of the field of view. A region between the first vertical angle of the field of view and the second vertical angle of the field of view is the range of the vertical field of view corresponding to the first preset ROI region. The second preset ROI region corresponds to a third vertical angle of the field of view and a fourth vertical angle of the field of view. A region between the third vertical angle of the field of view and the fourth vertical angle of the field of view is a range of the vertical field of view corresponding to the second preset ROI region. When the solid-state LiDAR includes three, four or more preset ROI regions, the same applies, and the details are not repeated here.

S204: when it is monitored that the micro galvanometer scans the first vertical angle of the field of view, reducing a slow axis scanning speed of the micro galvanometer to a first preset speed.

It can be seen from the foregoing that the motion of the micro galvanometer achieves progressive scanning of the field of view. The smaller an angular speed at which the micro galvanometer scans along the slow axis, the smaller a deflection angle of the micro galvanometer along the slow axis after scanning each line is, the smaller a line spacing is, and the greater a vertical resolution is. The slow axis scanning speed of the micro galvanometer is an angular speed of the micro galvanometer moving along the slow axis.

As mentioned above, when the micro galvanometer scans the first vertical angle of the field of view, it indicates that the detection beam enters the preset ROI region. The slow axis scanning speed of the micro galvanometer is reduced to the first preset speed. The first preset speed is less than an initial speed. It means that in the preset ROI region, the slow axis scanning speed of the micro galvanometer is within a non-ROI region before the preset ROI region. The vertical resolution of the preset ROI region is greater than a vertical resolution of a previous non-ROI region. When the micro galvanometer scans the first vertical angle of the field of view, the micro galvanometer enters the preset ROI region, reduces the slow axis scanning speed to the first preset speed, and increases the vertical resolution of the preset ROI region.

The first preset speed can be set according to requirements. The greater the vertical resolution is required by the preset ROI region, the smaller the slow axis scanning speed is. The first preset speed can be a constant value or a stepwise value. For example, a value of the first preset speed can include 4 m rad/s, 3 m rad/s, 2 m rad/s arranged in sequence. Each value corresponds to the scanning of two lines of the micro galvanometer. First and second lines of a slow axis scanning speed of the preset ROI region scanned by the micro galvanometer is 4 m rad/s. A slow axis scanning speed of scanning the third and fourth lines is 3 m rad/s. A slow axis scanning speed of scanning the fifth and sixth lines is 2 m rad/s. The scanning of the preset ROI region is ended.

Then the vertical resolution formed after the micro galvanometer scans the preset ROI region gradually becomes greater. It can be understood that the value of the first preset speed can also be gradually increased, first decreased and then increased, first increased and then decreased, etc., which can be set according to the requirements for the vertical resolution during the detection process.

S205: when it is monitored that the micro galvanometer scans the second vertical angle of the field of view, adjusting the slow axis scanning speed of the micro galvanometer to a second preset speed; wherein, the first preset speed is less than the second preset speed.

As mentioned above, when the micro galvanometer scans the second vertical angle of the field of view, it means that the detection beam leaves the preset ROI region, and the slow axis scanning speed of the micro galvanometer is adjusted to increase to the second preset speed. The first preset speed is less than the second preset speed. When the micro galvanometer scans the second vertical angle of the field of view, the micro galvanometer leaves the preset ROI region, enters the non-ROI region after the preset ROI region, increases the slow axis scanning speed to the second preset speed, and decreases the vertical resolution of the non-ROI region after the preset ROI region.

The non-ROI region before the preset ROI region is recorded as the previous non-ROI region, and the non-ROI region after the preset ROI region is recorded as a subsequent non-ROI region. The second preset speed can be equal to the initial speed. The vertical resolutions of the previous non-ROI region and the subsequent non-ROI region are equal. The second preset speed can also be less than the initial speed. The vertical resolution of the previous non-ROI region is less than the vertical resolution of the subsequent non-ROI region. The second preset speed can also be greater than the initial speed. The vertical resolution of the previous non-ROI region is greater than the vertical resolution of the subsequent non-ROI region. The value of the second preset speed can be set according to detection requirements.

In an embodiment of the present application, a vertical angle range of the field of view scanned by the solid-state LiDAR includes a vertical angle range of the field of view of a preset ROI region, a first vertical angle of the field of view corresponding to a starting position and a second vertical angle of view corresponding to an ending position are determined according to a range of the preset ROI region. During an operating process of a micro galvanometer scanning module, a 2D galvanometer moves from a previous position to a next position along a slow axis, and completes a reciprocating motion along a fast axis to scan a line of the field of view. Similarly, during a process that the micro galvanometer continues to move along the slow axis to the next position, the reciprocating motion along the fast axis starts to scan a next line of the field of view. Therefore, the scanning speed of the slow axis of the micro galvanometer determines a spacing between scanned lines. When the scanning speed of the slow axis of the micro galvanometer decreases, the spacing between the scanned lines becomes smaller, and a vertical resolution is improved. On the contrary, when the scanning speed of the slow axis of the micro galvanometer increases, the spacing between the scanned lines becomes larger, and the vertical resolution is decreased. When it is detected that the micro galvanometer scans the first vertical angle of view, it means that the scanning optical path at this time enters the preset ROI region. The slow axis scanning speed of the micro galvanometer is reduced and the vertical resolution of the scanning of the solid-state LiDAR is improved. When the micro galvanometer scans the second vertical angle of view, it means that the scanning optical path at this time leaves the preset ROI region. The slow axis scanning speed is adjusted to the second preset speed, and the second preset speed is greater than the first preset speed. Compared with the preset ROI region, the vertical resolution of solid-state LiDAR scanning is reduced. By controlling the slow axis scanning speed of a MEMS micro galvanometer, a vertical scanning of a preset middle ROI region is denser and two sides are sparser, so that the vertical resolution of the preset ROI is effectively improved, and the LiDAR can scan accurately in the ROI region.

In a preferred implementation, important objects such as other vehicles, road surfaces, roadsides, and pedestrians are prone to appear in the region directly in front of the solid-state LiDAR. Usually, people pay more attention to the front central region and the ROI region is preset in the middle region in the field of view of the solid-state LiDAR. The field of view of the solid-state LiDAR is divided into three regions in a vertical direction, that is, a region A, a region B, and a region C shown in FIG. 2$b$, and the region B is the preset ROI region. An upper boundary (that is, the starting boundary) of the region B corresponds to the first vertical angle of view, and a lower boundary (that is, the ending boundary) of the region B corresponds to the second vertical angle of view. As for the slow-axis scanning speed, the micro galvanometer scans the region A at an initial speed, scans the region B at the first preset speed, and scans the region C at the second preset speed; and the second preset speed is equal to the initial speed, and the first preset speed is less than the initial speed or the second preset speed. A fast-axis scanning speed of the micro galvanometer remains unchanged. FIG. 2$b$ shows a scanning pattern formed after scanning by the micro galvanometer. The same horizontal resolution is used for the region A, the region B and the region C. The vertical resolution for the region B is greater than the vertical resolution for the region A, and the vertical resolution for the region B is greater than the vertical resolution for the region C. The same vertical resolution is used for the region A and the region C. The middle region in the field of view includes a preset ROI region, which can detect objects in the front central region more accurately and precisely.

FIG. 2$c$ is a schematic diagram of distribution of detection beams in a vertical direction. An upper region is a region between vertical angles of view R1 and R2, and detection beams within ∠R1OR2 are directed at the region A in FIG. 2$b$. A middle region is a region between vertical angles of view R2 and R3, and detection beams within ∠R2OR3 are directed at the region B in FIG. 2$b$. The lower region is a region between vertical angles of view R3 and R4, and detection beams within ∠R3OR4 are directed at the region C in FIG. 2$b$. It can be seen from the foregoing description that when the micro galvanometer moves along the slow axis within the vertical angle of view ∠R1OR2, the slow-axis scanning speed is the initial speed; when the micro galvanometer moves within the vertical angle of view ∠R2OR3, the slow-axis scanning speed is the first preset speed; or when the micro galvanometer moves within the vertical angle of view ∠R3OR4, the slow-axis scanning speed is the second preset speed. Detection beams of the solid-state LiDAR are first sparsely distributed, then densely distributed, and finally sparsely distributed in a vertical direction from top to bottom, which meets the requirement for the solid-state LiDAR to perform more accurate detection on the front central region.

Figure 2D:
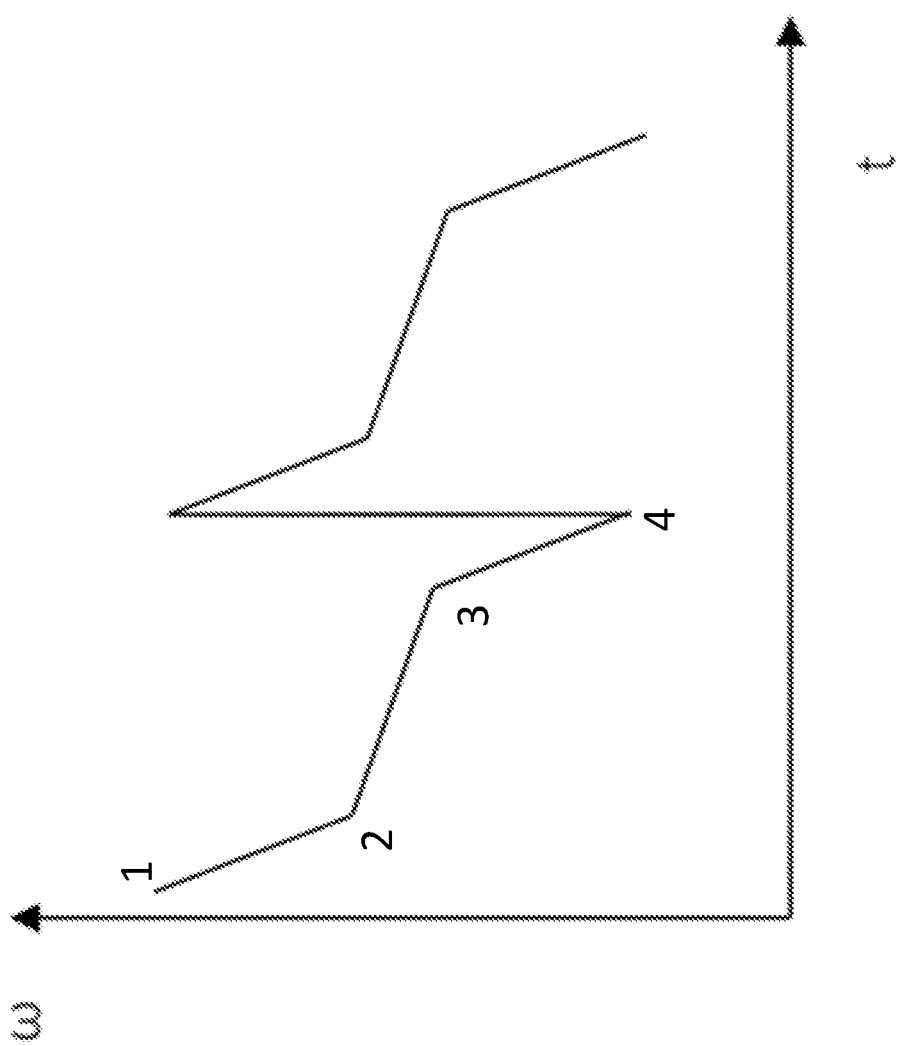
FIG. 2d is a schematic diagram of a time-dependent change in a slow-axis deflection angle of a micro galvanometer according to an embodiment of this application.

FIG. 2d is a schematic diagram of a time-dependent change in a slow-axis deflection angle of a micro galvanometer. An abscissa represents time, and an ordinate represents the deflection angle of the micro galvanometer when moving along the slow axis. A slope factor of a broken line in a coordinate system is the slow-axis scanning speed. A detection period is between 1 and 4. It can be seen that a line segment between 1 and 2 corresponds to a front non-ROI region (that is, a region A), and a line segment between 2 and 3 corresponds to the preset ROI region (that is, a region B). A line segment between 3 and 4 corresponds to a rear non-ROI region (that is, a region C). The slope factor between 2 and 3 is the smallest, indicating that the slow axis scanning speed of the preset ROI region is the smallest and the resolution is the highest. Turning points 2 and 3 of the slow-axis scanning speed correspond to the starting boundary and the ending boundary of the preset ROI region, respectively. The next detection period is between 4 and 5.

The field of view of the solid-state LiDAR is divided into three regions in the vertical direction. Vertical resolution for the middle region is the maximum, and vertical resolution for upper and lower regions on both sides is lower. The field of view includes a preset ROI region, which can meet a detection requirement for detecting an object in the front central region more accurately and precisely during use. In addition, vertical resolution for upper and lower non-ROI regions on both sides is lower, which can reduce occupation of rear-end computing and simplify a systematic design of the solid-state LiDAR. The same vertical resolution is used for the upper and lower regions on both sides and is less than the vertical resolution for the preset ROI region, which can also simplify the control logic while meeting the detection requirement.

In a possible implementation, before step S202 of a method for controlling a micro galvanometer of a solid-state LiDAR provided in the foregoing embodiment, the method further includes:

S201: adjusting a vertical angle of a field of view of the solid-state LiDAR by adjusting a slow axis amplitude of the micro galvanometer; wherein, the vertical angle of the field of view of the solid-state LiDAR is proportional to the slow axis amplitude of the micro galvanometer.

As mentioned above, the detection laser light emits to the micro galvanometer at an incident angle $\alpha$, and then emits outward at a reflection angle $\alpha$ after being reflected by the micro galvanometer. The micro galvanometer is driven to move. The incident angle $\alpha$ of the detection laser light is also constantly changed. An outward emitting angle after the detection laser light is reflected by the micro galvanometer is also constantly changed. Therefore, a range of the field of view of the solid-state LiDAR formed by a vibration of the micro galvanometer is determined by an amplitude of the micro galvanometer. A vertical angle range of the field of view of the solid-state LiDAR is proportional to a slow axis amplitude of the micro galvanometer. When the slow axis amplitude of the micro galvanometer increases, a deflection angle of the micro galvanometer along the slow axis increases, and a vertical angle of the field of view of the solid-state LiDAR formed by the scanning of the mirror galvanometer increases; and vice versa.

It can be seen from the foregoing that by adjusting the slow axis scanning speed and the slow axis amplitude of the micro galvanometer, different features of the vertical angles of the field of view can be achieved, and a flexibility of detection of the solid-state LiDAR can be improved. For example, when the slow axis amplitude is halved and the slow axis scanning speed is doubled, the vertical angle of the field of view is halved. The vertical resolution caused by the doubling of the slow axis scanning speed is doubled. Since the vertical angle of the field of view is halved, the vertical resolution remains unchanged. By analogy, when the slow axis amplitude is halved and the slow axis scanning speed remains unchanged, the vertical angle of the field of view is halved and the resolution of the vertical angle is doubled. The present application is suitable for long-distance high-resolution detection, such as a long-distance high-speed radar. When the slow axis amplitude is halved and the slow axis scanning speed is halved, the vertical angle of the field of view is halved, and the vertical resolution is increased by four times. The present application is suitable for long-distance extremely high-resolution detection, such as the long-distance high-speed radar. When the slow axis amplitude is unchanged and the slow axis scanning speed is halved, the vertical angle of the field of view is unchanged, and the vertical resolution is doubled. The present application is suitable for high-resolution detection of a low speed and a wide angle of the field of view, such as a vehicle following radar or a vehicle reversing radar. When the slow axis amplitude is unchanged and the slow axis scanning speed is doubled, the vertical angle of the field of view is unchanged and the vertical resolution is halved. The present application is suitable for short-range emergency detection, such as a blind-filling radar.

Figure 3:
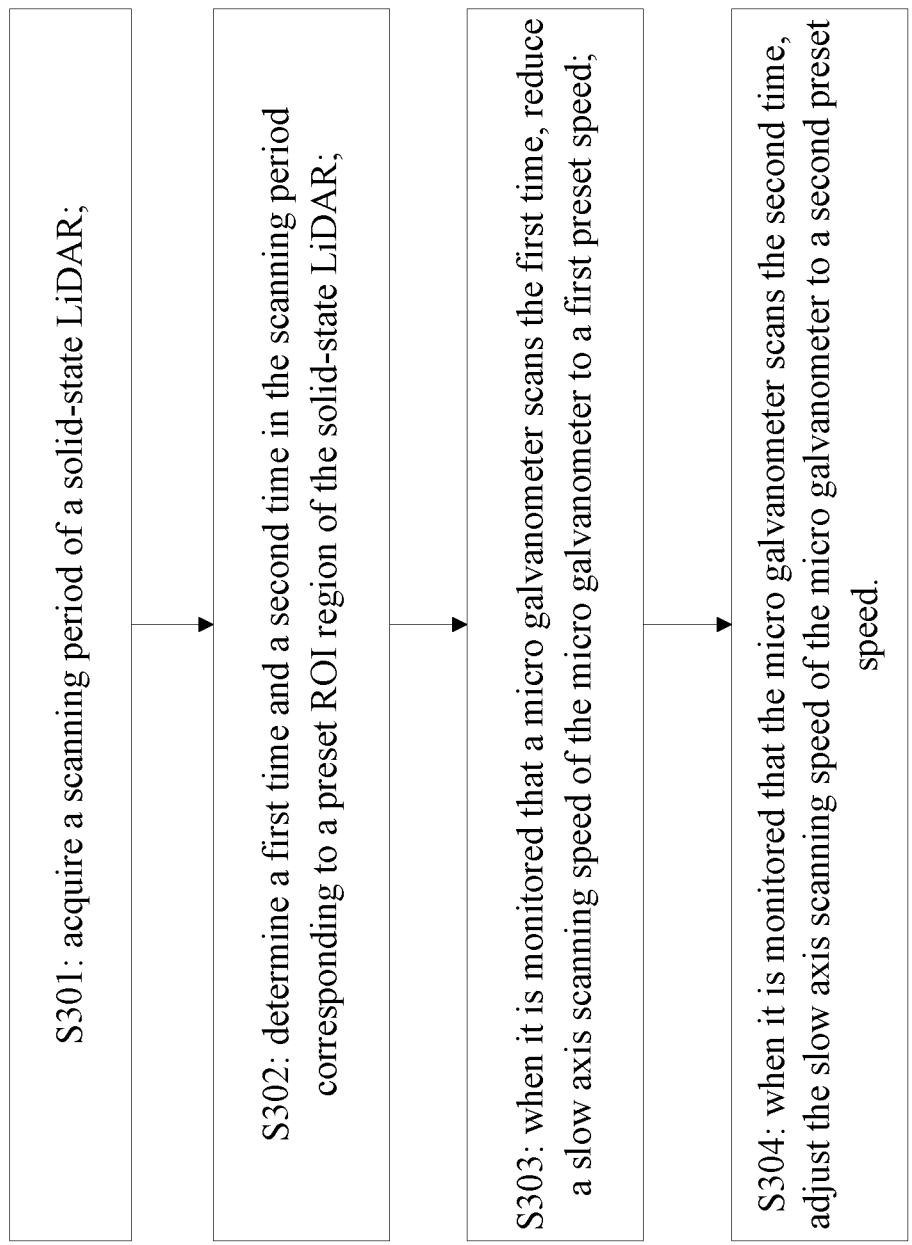
FIG. 3 is a schematic flowchart of yet another method for controlling a micro galvanometer of a solid-state LiDAR according to an embodiment of the present application.

Please refer to FIG. 3, which is a schematic flowchart of another method for controlling a micro galvanometer of a solid-state LiDAR according to an embodiment of the present application. The method includes but is not limited to the following steps:

S301: acquiring a scanning period of the solid-state LiDAR.

The solid-state LiDAR is scanned with a micro galvanometer, and one complete scanning by the micro galvanometer is one scanning period. For example, the micro galvanometer starts to move along the slow axis and the fast axis from a starting position. The detection laser light is reflected by the micro galvanometer at this point and then emits to an upper left corner of the field of view. When the micro galvanometer moves along the slow axis to the next position, the micro galvanometer completes one reciprocating motion along the fast axis to scan a first line of the field of view. Similarly, when the micro galvanometer moves along the slow axis to the next position, the micro galvanometer performs the reciprocating motion along the fast axis and starts the scanning of a next line of the field of view. Until the micro galvanometer moves along the slow axis to the lowest position, the micro galvanometer completes one reciprocating motion along the fast axis, and goes back to an initial position. Then one scanning cycle is completed. It can be seen that for a completion of the slow axis of the micro galvanometer, the micro galvanometer is from a starting position to an ending position, and returns to the starting position, which is one scanning period. The scanning $$\text{period} = \frac{1}{\text{a slow axis scanning frequency}}.$$

The slow axis scanning frequency is the number of times that the slow axis of the micro galvanometer completes the scanning in a unit time, and the unit time can be 100 ms. A frame rate of the solid-state LiDAR refers to the number of times that the solid-state LiDAR completes a complete scanning in the unit time, and data obtained from a plurality of complete scanning in the unit time is packaged and uploaded to a host computer. When the unit time of the slow axis scanning frequency is the same as that of the frame rate, the slow axis scanning frequency=the frame rate of the solid-state LiDAR.

S302: determining a first time and a second time in the scanning period corresponding to the preset ROI region of the solid-state LiDAR; wherein, the first time is a starting time when a scanning optical path enters the preset ROI region, and the second time is an ending time when the scanning optical path leaves the preset ROI region.

The preset ROI region is arranged in a vertical direction in the field of view of the solid-state LiDAR according to the detection requirements. A first time is a starting time when a scanning optical path enters the preset ROI region, and a second time is an ending time when the scanning optical path leaves the preset ROI region. The solid-state LiDAR is provided with a clock. In one detection period, when the clock timing reaches the first time, the scanning optical path enters the preset ROI region. Conversely, when the clock timing reaches the second time, the scanning optical path leaves the preset ROI region.

Since the solid-state LiDAR selects the micro galvanometer model during design, a fast axis scanning frequency of the micro galvanometer is known, that is, the unit time required for the micro galvanometer to scan one line is known. On the premise that the fast axis scanning frequency and a fast axis amplitude remain unchanged, the number of lines scanned by the micro galvanometer can be calculated via ΔT1 from the initial time to the first time. The initial scanning speed before the scanning optical path enters the preset ROI region is also known, that is, an interval between the lines scanned by a detection beam is known. It can be seen that time in the detection period corresponds to the scanning position of the micro galvanometer. Therefore, the first time and the second time are determined by a clock, which is to determine a starting position and an ending position of the preset ROI region in the field of view of the solid-state LiDAR.

The preset ROI region can also include a plurality of preset ROI regions, and each of the preset ROI regions includes a starting time and an ending time of the scanning optical path entering the preset ROI region and leaving the ROI region.

S303: when it is monitored that the micro galvanometer scans the first time, reducing the slow axis scanning speed of the micro galvanometer to a first preset speed.

When the micro galvanometer scans the first time, it means that the detection beam enters the preset ROI region. The slow axis scanning speed of the micro galvanometer is reduced to the first preset speed. The first preset speed is less than an initial speed, and the vertical resolution of the preset ROI region is improved.

A method for setting the first preset speed is similar to the contents described in step 204 of the foregoing embodiments, which is not repeated here.

S304: when it is monitored that the micro galvanometer scans the second time, adjusting the slow axis scanning speed of the micro galvanometer to a second preset speed; wherein, the first preset speed is less than the second preset speed.

When the micro galvanometer scans the second time, it means that the detection beam leaves the preset ROI region and enters the non-ROI region after the preset ROI region. The slow axis scanning speed of the micro galvanometer is adjusted and increased to the second preset speed. The vertical resolution of the non-ROI region after the preset ROI region is reduced.

A method for setting the second preset speed is similar to the contents described in step 205 of the foregoing embodiments, which is not repeated here.

In the embodiment of the present application, the scanning period of the solid-state LiDAR, includes the scanning time range of the preset ROI region. The first time corresponding to the starting time and the second time corresponding to the ending time are determined according to a range of the preset ROI region. When it is detected that the micro galvanometer scans the first time, it means that the scanning optical path at this time enters the preset ROI region. The slow axis scanning speed of the micro galvanometer is reduced and the vertical resolution of the scanning of the solid-state LiDAR is improved. When the micro galvanometer scans the second time, it means that the scanning optical path at this time leaves the preset ROI region. The slow axis scanning speed is adjusted to the second preset speed, and the second preset speed is greater than the first preset speed. Compared with the preset ROI region, the vertical resolution of solid-state LiDAR scanning is reduced. By controlling the slow axis scanning speed of a MEMS micro galvanometer, a vertical scanning of a preset middle ROI region is denser and two sides are sparser, so that the vertical resolution of the preset ROI is effectively improved, and the LiDAR can scan accurately in the ROI region.

FIG. 2a illustrates in detail a method for controlling a micro galvanometer of a solid-state LiDAR according to an embodiment of the present application. The following provides a device for controlling a micro galvanometer (hereinafter referred to as a device 4) according to an embodiment of the present application.

Figure 4:
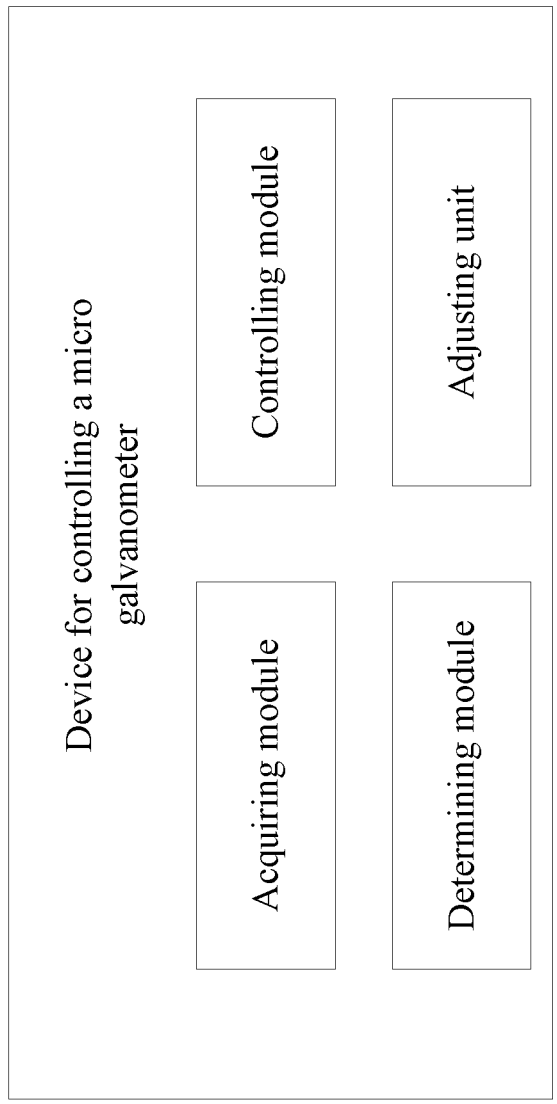
FIG. 4 is a schematic diagram of a device for controlling a micro galvanometer according to an embodiment of the present application.

The device 4 shown in FIG. 4 can be the device for controlling the micro galvanometer of the embodiment shown in FIG. 2a, and the device 4 includes:

an acquiring module, configured to acquire a vertical angle range of a field of view scanned by the solid-state LiDAR;

a determining module, configured to determine a first vertical angle of the field of view and a second vertical angle of the field of view corresponding to the preset ROI region of the solid-state LiDAR; wherein, a middle region between the first vertical angle of the field of view and the second vertical angle of the field of view is a range of a vertical field of view corresponding to the ROI region; and a controlling module, configured to reduce a slow axis scanning speed of the micro galvanometer to a first preset speed when it is monitored that the micro galvanometer scans the first vertical angle of the field of view, and to adjust the slow axis scanning speed of the micro galvanometer to a second preset speed when it is monitored that the micro galvanometer scans the second vertical angle of the field of view; wherein, the first preset speed is less than the second preset speed.

In a possible implementation, the vertical angle range of the field of view scanned by the solid-state LiDAR is −12.5°~12.5°.

In a possible implementation, the first vertical angle of the field of view and the second vertical angle of the field of view corresponding to the preset ROI region are determined by a fixed height of the solid-state LiDAR and a detection range corresponding to the preset ROI region.

In one possible embodiment, the control device further includes:
an adjusting unit, configured to adjust the vertical angle of the field of view of the solid-state LiDAR by adjusting the slow axis amplitude of the micro galvanometer; wherein, the range of the vertical field of view of the solid-state LiDAR is proportional to the slow axis amplitude.

The embodiment of the present application and the method embodiment of FIG. 2a are based on the same concept, and their technical effects are also the same. For a specific process, please refer to the description of the method embodiment in FIG. 2a, which is not repeated here.

FIG. 3 illustrates in detail another method for controlling a micro galvanometer of a solid-state LiDAR according to an embodiment of the present application. The following provides another device for controlling a micro galvanometer (hereinafter referred to as a device 5) according to an embodiment of the present application.

Figure 5:
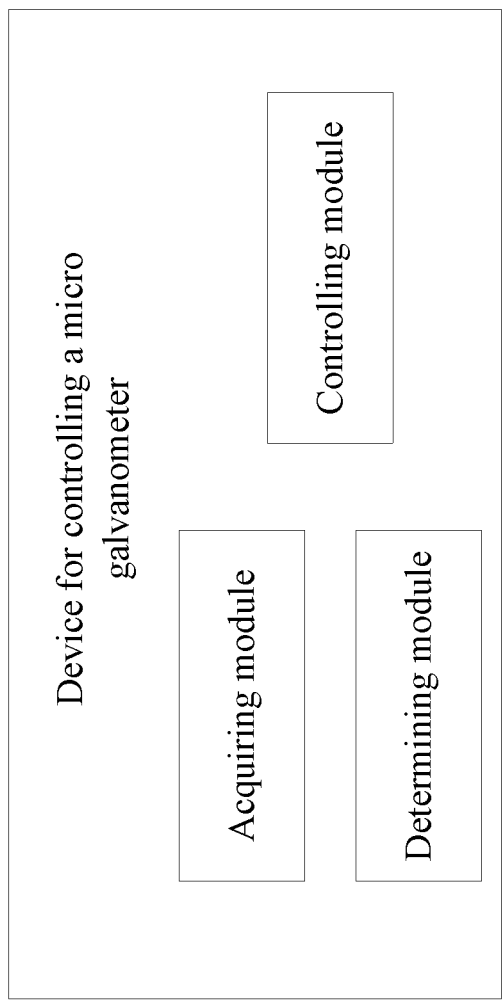
FIG. 5 is a schematic diagram of a device for controlling a micro galvanometer according to an embodiment of the present application.

The device 5 shown in FIG. 5 can be the device for controlling the micro galvanometer of the embodiment shown in FIG. 3, and the device 5 includes:
an acquiring module, configured to acquire a scanning period of a solid-state LiDAR;
a determining module, configured to determine a first time and a second time in the scanning period corresponding to a preset ROI region of the solid-state LiDAR; wherein, the first time is a starting time when a scanning optical path enters the ROI region, and the second time is a time when the scanning optical path leaves the ROI region; and
a controlling module, configured to reduce a slow axis scanning speed of the micro galvanometer to a first preset speed when it is monitored that the micro galvanometer scans the first time, and to adjust the slow axis scanning speed of the micro galvanometer to a second preset speed when it is monitored that the micro galvanometer scans the second time; wherein, the first preset speed is less than the second preset speed.

In a possible implementation, the scanning period of the solid-state LiDAR is $$\frac{1}{a\ slow\ axis\ scanning\ frequency}.$$

In a possible implementation, the slow axis scanning frequency of the solid-state LiDAR is 5 Hz-20 Hz.

The embodiment of the present application and the method embodiment of FIG. 3 are based on the same concept, and their technical effects are also the same. For a specific process, please refer to the description of the method embodiment in FIG. 3, which is not repeated here.

The device 4 and the device 5 can be a field-programmable gate array (FPGA), a dedicated integrated chip, a system on chip (SoC), a central processing unit (CPU), a network processor (NP), a digital signal processing circuit, a micro controller unit (MCU), a programmable logic device (PLD) or other integrated chips that achieve related functions.

The processor may be a central processing unit (CPU), a network processor (NP) or a combination of the CPU and the NP.

The processor can further include a hardware chip. The forgoing hardware chip can be an application-specific integrated circuit (ASIC), a programmable logic device (PLD), or a combination thereof. The forgoing PLD may be a complex programmable logic device (CPLD), a field-programmable gate array (FPGA), a generic array logic (GAL) or any combination thereof.

A memory can include a volatile memory, such as a random-access memory (RAM). The memory can also include a non-volatile memory, such as a flash memory, a hard disk drive (HDD) or a solid-state drive (SSD). The memory can also include a combination of the above types of memories.

An embodiment of the present application also provides a solid-state LiDAR system, including:
an emitting module, configured to emit detection laser light;
a receiving module, configured to receive echo laser light;
a micro galvanometer scanning device, configured to deflect the detection laser light to achieve scanning, and also configured to receive the echo laser light and deflect the echo laser light to the receiving module; and
the forgoing device 4 or device 5 for controlling the micro galvanometer, configured to control the micro galvanometer scanning device to scan.

An embodiment of the present application also provides a computer storage medium storing a computer program, and the computer program executes the method for controlling the micro galvanometer of the solid-state LiDAR provided in the foregoing embodiments.

An embodiment of the present application also provides a computer program product containing instructions. When running on a computer, the instructions cause the computer to execute the method for controlling the micro galvanometer of the solid-state LiDAR provided in the foregoing embodiments.

A person skilled in the art understands that the embodiments of the present application can be provided as methods, systems, or computer program products. Therefore, the present application can use forms of a complete hardware embodiment, a complete software embodiment, or an embodiment combining software and hardware. Moreover, the present application can use a form of a computer program product implemented on one or more computer-usable storage media (including but not limited to a disk storage, a CD-ROM, an optical storage, etc.) containing computer-usable program codes.

The present application is described with reference to flowcharts and/or block diagrams of methods, devices (systems), and computer program products according to embodiments of the present application. It should be understood that each process and/or block in the flowchart and/or the block diagram, and combinations of the processes and/or the blocks in the flowchart and/or the block diagram can be achieved by computer program instructions. These computer program instructions can be provided to a processor of a general-purpose computer, a special-purpose computer, an embedded processor, or other programmable data processing equipment to generate a machine, so that the instructions executed by the processor of the computer or the other programmable data processing equipment generate a device that achieves functions specified in one process or a plurality of processes in the flowchart and/or one block or a plurality of blocks in the block diagram.

These computer program instructions can also be stored in a computer-readable memory that can direct the computer or the other programmable data processing equipment to work in a specific manner, so that the instructions stored in the computer-readable memory produce an article of manufacture including an instruction device. The instruction device implements the functions specified in one process or the plurality of processes in the flowchart and/or one block or the plurality of blocks in the block diagram.

These computer program instructions can also be loaded on the computer or the other programmable data processing equipment, so that a series of operation steps are executed on the computer or the other programmable equipment to produce computer-implemented processing. Therefore, the instructions executed on the computer or the other programmable equipment provide steps for implementing functions specified in one process or the plurality of processes in the flowchart and/or one block or the plurality of blocks in the block diagram.

What is claimed is:

1. A method of controlling a micro galvanometer of a solid-state LiDAR, comprising:
    acquiring a vertical angle range of a field of view scanned by the solid-state LiDAR;
    determining a first vertical angle of the field of view and a second vertical angle of the field of view corresponding to a preset ROI region of the solid-state LiDAR, wherein a region between the first vertical angle of the field of view and the second vertical angle of the field of view is a range of a vertical field of view corresponding to the preset ROI region;
    when it is monitored that the micro galvanometer scans the first vertical angle of the field of view, reducing a slow axis scanning speed of the micro galvanometer to a first preset speed; and
    when it is monitored that the micro galvanometer scans the second vertical angle of the field of view, adjusting the slow axis scanning speed of the micro galvanometer to a second preset speed, wherein the first preset speed is less than the second preset speed.

2. The method according to claim 1, wherein the vertical angle range of the field of view scanned by the solid-state LiDAR ranges from −12.5° to 12.5°.

3. The method according to claim 2, wherein the first vertical angle of the field of view and the second vertical angle of the field of view corresponding to the preset ROI region is determined by a fixed height of the solid-state LiDAR and a detection range corresponding to the preset ROI region.

4. The method according to claim 1, wherein before acquiring the vertical angle range of the field of view scanned by the solid-state LiDAR, the method further comprises:
    adjusting the vertical angle of the field of view of the solid-state LiDAR by adjusting a slow axis amplitude of the micro galvanometer, wherein the vertical angle of the field of view of the solid-state LiDAR is proportional to the slow axis amplitude of the micro galvanometer.

5. A device of controlling a micro galvanometer of a solid-state LiDAR, wherein the solid-state LiDAR includes the micro galvanometer, and the micro galvanometer performs 2D vibration and is configured to deflect detection laser light and echo laser light to detect a field of view, the device comprising:
    an acquiring module, configured to acquire a vertical angle range of a field of view scanned by a solid-state LiDAR;
    a determining module, configured to determine a first vertical angle of the field of view and a second vertical angle of the field of view corresponding to a preset ROI region of the solid-state LiDAR, wherein a middle region of the first vertical angle of the field of view and the second vertical angle of the field of view is a range of a vertical field of view corresponding to the ROI region; and
    a controlling module, configured to reduce a slow axis scanning speed of the micro galvanometer to a first preset speed when it is monitored that the micro galvanometer scans the first vertical angle of the field of view, and to adjust the slow axis scanning speed of the micro galvanometer to a second preset speed when it is monitored that the micro galvanometer scans the second vertical angle of the field of view, wherein the first preset speed is less than the second preset speed.

6. The device according to claim 5, wherein the vertical angle range of the field of view scanned by the solid-state LiDAR ranges from −12.5° to 12.5°.

7. The device according to claim 6, wherein the first vertical angle of the field of view and the second vertical angle of the field of view corresponding to the preset ROI region is determined by a fixed height of the solid-state LiDAR and a detection range corresponding to the preset ROI region.

8. The device according to claim 5, wherein the device further comprises:
    an adjusting unit, configured to adjust the vertical angle of the field of view of the solid-state LiDAR by adjusting a slow axis amplitude of the micro galvanometer, wherein the range of the vertical field of view of the solid-state LiDAR is proportional to the slow axis amplitude.

* * * * *